March 19, 1946.  C. L. MORRIS  2,396,743
AUTOMATIC BRAKE
Filed June 5, 1944

Inventor
Charles L. Morris,
By McMorrow & Berman
Attorneys

Patented Mar. 19, 1946

2,396,743

UNITED STATES PATENT OFFICE 2,396,743

AUTOMATIC BRAKE

Charles L. Morris, Cannelton, W. Va., assignor of forty per cent to D. L. Peters, Cannelton, W. Va.

Application June 5, 1944, Serial No. 538,755

2 Claims. (Cl. 188—174)

The present invention relates to new and useful improvements in brake mechanisms designed primarily for use upon mine cars and the invention has for its primary object to provide electrically controlled means for maintaining the brakes in a released position while the power line for operating the cars is unbroken and in which the brake mechanism is arranged to automatically apply the brakes upon an interruption in the power line, or when the power is cut off at the control of the cars.

A further object of the invention is to provide an apparatus of this character of simple and practical construction, which is efficient and reliable in performance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
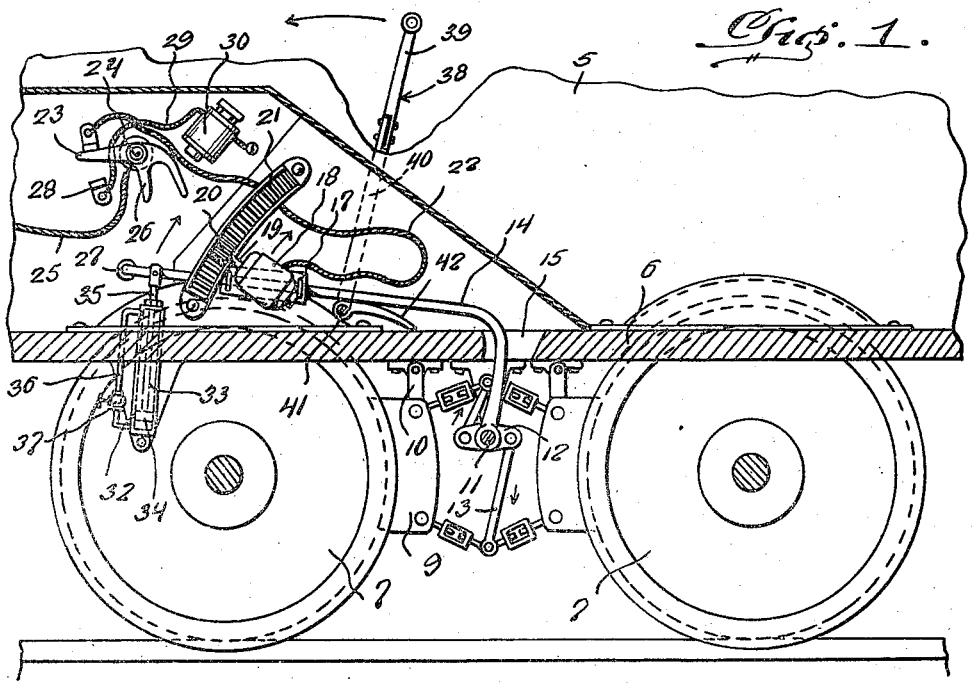
Figure 1 is a fragmentary longitudinal sectional view of a mine car showing the brake mechanism installed in position thereon.
Figure 2:
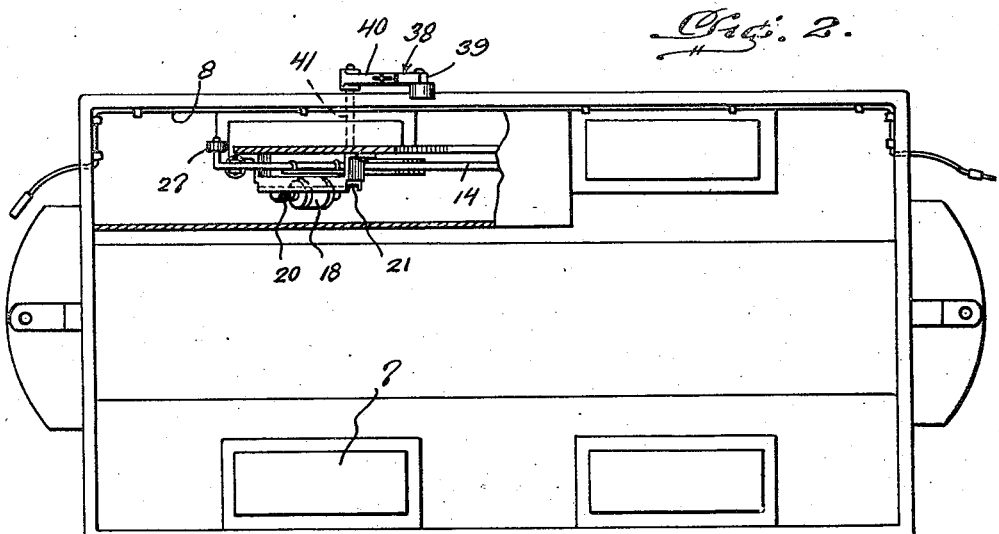
Fig. 2 is a top plan view of the mine car with parts broken away and shown in section.

Referring now to the drawing in detail wherein for the purpose of illustration I have disclosed a preferred embodiment of the invention, the numeral 5 designates the mine car generally which includes a bottom 6 and wheels 7. An electric cable 8 extends from one end of the car to the other to provide an electrical connection between coupled cars.

The brake mechanism for the wheels 7 includes brake shoes 9 pivotally supported on the under side of the car by hangers 10 for movement into and out of engagement with the wheels. The brake shoes 9 are applied and released by means of a transversely extending shaft 11 having arms 12 extending oppositely therefrom and to which link members 13 form a connection between the arms and the upper and lower edges of the brake shoes as shown to advantage in Fig. 1 of the drawing. The brakes are applied by a rotation of the shaft 11 in one direction and are released by an opposite rotation of the shaft to move the links 13 in a direction as shown by the arrows.

A lever 14 extends upwardly from the shaft 11 through an opening 15 in the bottom of the car and is formed with a substantially horizontally inclined upper end. Attached to the lever 14 near the upper end thereof is a mounting 17 for an electric motor 18, the shaft 19 of the motor having a pinion 20 secured thereto adapted to travel along an arcuate rack 21 secured to a side of the car. The rack 21 is curved on a radius from the axis of the shaft 11.

A circuit wire 22 leads from the motor to one end of a pivoted contact 23 supported on the side of the car and suitably insulated therefrom, the pivot 24 of the contact having a circuit wire 25 leading therefrom and connected to the power line 8.

The other end of the contact 23 is formed with a weighted yoke 26 which normally gravitates into a downwardly extended position and is adapted to receive a roller 27 carried on the outer end of the lever 14, when the latter is moved upwardly.

The upward movement of the lever 14 will cause an engagement of the roller 27 in the yoke 26 to also move the latter upwardly to swing the other end of the contact arm 23 downwardly for engaging a stationary contact 28 secured to the side of the car and having a circuit wire 29 leading therefrom to an electro-magnet 30 which latter is grounded to the side of the car and has its armature disposed in the path of one leg of the yoke 26 upon the upward movement of the latter. Accordingly when the yoke 26 is moved upwardly and the contacts 23 and 28 close the circuit the electro-magnet 30 will be energized and maintain the yoke 26 in its uppermost position and thus support the lever 14 in its raised position for releasing the brakes.

Figure 3:
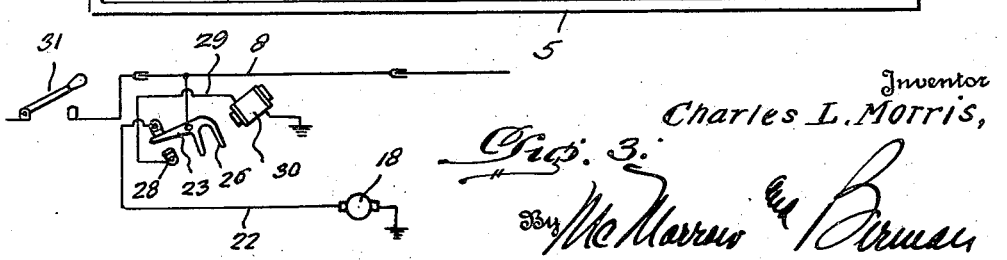
Fig. 3 is a diagram of the electric circuit for controlling the brakes.

The cable 8 is provided with a control switch 31 in the power line (see diagram in Figure 3) so that when the switch 31 is closed the motor 18 will be energized to rotate the pinion 20 and thus raise the lever 14 whereby the roller 27 will engage and actuate the pivoted contact 23 to energize the electro-magnet 30 and hold the lever 14 in its raised position and at the same time deenergize the motor 18.

Should the switch 31 be opened or the power line otherwise interrupted the electro-magnet 30 will then be de-energized and the weight of the motor 18 carried by the lever 14 will cause a gravitated downward movement of the lever to release the roller 27 from the yoke 26 of the pivoted contact and to apply the brakes.

The downward swinging movement of the lever 14 is controlled by a dash pot mechanism 32 including a cylinder 33 secured to the mine car having a piston 34 working therein and connected to the lever 14 by the piston rod 35. The upper and lower ends of the cylinder are connected by a by-pass pipe 36 having a manually controlled valve 37 therein. The brakes may also be released manually by means of a hand lever 38 including an upper section 39 adjustably connected to and insulated from a lower lever section 40 pivoted to the side of the mine car as at 41 and having an arcuate-shaped lift foot 42 attached thereto and disposed under the lever 14. A movement of the lever 38 in the direction shown by the arrow in Fig. 1 will raise the lever 14 and release the brakes.

It is believed the details of construction, manner of operation and advantages of the device will be readily understood from the foregoing without further detailed explanation.

Having thus described the invention, what I claim is:

1. A vehicle brake control mechanism comprising a gravity actuated pivotal lever connected to the brakes of the vehicle for applying the brakes upon a downward movement of the lever, an electric motor mounted on the lever and serving as a weighting element effective in the gravitation of the lever, a rack and pinion arranged for raising the lever upon energization of the motor to release the brakes, the rack being arcuate and formed on a radius from the axis of the lever and the pinion being fixed on the rotor of the motor and in toothed engagement with the rack, a pivoted contact mounted on the vehicle and controlling the circuit of the motor, said contact including a yoke engageable by the lever for actuating the contact to de-energize the motor upon a predetermined upward brake releasing movement of the lever, an electro-magnet located cooperatively adjacent to said pivotal contact and energized by the movement of the contact to de-energize the motor, said electro-magnet being disposed in the path of the yoke whereby to hold the latter in its raised position and said yoke in its magnetically held position holding the engaged lever in its raised position.

2. A vehicle brake control mechanism comprising a gravity actuated pivotal lever connected to the brakes for applying the brakes upon a downward movement of the lever, said lever being substantially horizontal in its lowered brake applying position, an electric motor mounted on the lever and having a pinion driven by its rotor and in toothed engagement with an arcuate rack mounted on an adjacent part of the vehicle for raising the lever to release the brakes, a pivoted contact mounted on the vehicle for controlling the circuit of the motor, said contact including a yoke engageable by the lever for actuating the contact to de-energize the motor upon a predetermined upward brake releasing movement of the lever, an electro-magnet located cooperatively adjacent to said pivotal contact and energized by the movement of the contact to deenergize the motor, said electro-magnet being disposed in the path of the yoke whereby to hold the latter in its raised position and said yoke holding the lever in its raised position when the yoke is under the holding influence of the electro-magnet, and a manually operable lever including means engageable with the first-named lever to raise the latter independently of the motor.

CHARLES L. MORRIS.